United States Patent [19]

Kumagai

[11] Patent Number: 5,130,649
[45] Date of Patent: Jul. 14, 1992

[54] SPEED DETECTION APPARATUS HAVING MAGNETIC ROTOR WITH TWO MAGNETIZED PORTIONS AND A CRESCENT SHAPED NON-MAGNETIZED PORTION

[75] Inventor: Yoshiki Kumagai, Fujieda, Japan

[73] Assignee: Victor Company of Japan, Ltd., Yokohama, Japan

[21] Appl. No.: 651,985

[22] Filed: Feb. 7, 1991

[30] Foreign Application Priority Data

Feb. 7, 1990 [JP] Japan .................. 2-11437[U]

[51] Int. Cl.[5] .................. G01P 3/36; G01B 7/14
[52] U.S. Cl. .................. 324/174; 324/175; 324/207.22; 324/207.25
[58] Field of Search .................. 324/173, 174, 207.22, 324/207.25; 341/15; 340/870.31, 670, 671, 672; 310/156, 168

[56] References Cited

FOREIGN PATENT DOCUMENTS

1-138419 1/1953 China .
1-127349 1/1956 China .

Primary Examiner—Walter E. Snow
Attorney, Agent, or Firm—Fleit, Jacobson, Cohn, Price, Holman & Stern

[57] ABSTRACT

A speed detection apparatus has a rotor magnet (11, 12, 13) having a plurality of magnetic coil portions formed in the direction of its circumference, and a coil pattern for signal detection (6, 7) rotationally displaced relative to an opposing rotor magnet. The rotor magnet has a first magnetized portion (5) for detection of a rotation phase of the rotor and formed in the one portion at a specific position and a second magnetized portion (8) for detection of a rotation speed of the rotor and provided at a portion other than the first magnetized portion and a non-magnetized portion (14) having a crescent shape and provided at a specific position of the rotor symmetrical from a center of rotation of the rotor magnet, with respect to the first magnetized portion.

7 Claims, 5 Drawing Sheets

SPEED DETECTION APPARATUS HAVING MAGNETIC ROTOR WITH TWO MAGNETIZED PORTIONS AND A CRESCENT SHAPED NON-MAGNETIZED PORTION

BACKGROUND OF THE INVENTION

The present invention relates to an improved speed detection apparatus having a rotation phase detector.

In general, in rotational drive apparatus such as rotating magnetic heads or the like, there are provided a speed detector (speed control circuit) and a phase detector that detect the speed of rotation and the phase of rotation of a rotating body, so that the speed of rotation of the rotating body such as a magnetic head drum or the like can be made a constant speed rotation of a required rotational phase, and each of these detector outputs is used in a drive motor having phase servo and speed servo. In this manner, a detection signal generator portion is formed by the combination of a FG (frequency generator) coil pattern, PU coil pattern and a rotor magnet.

Figure 1:
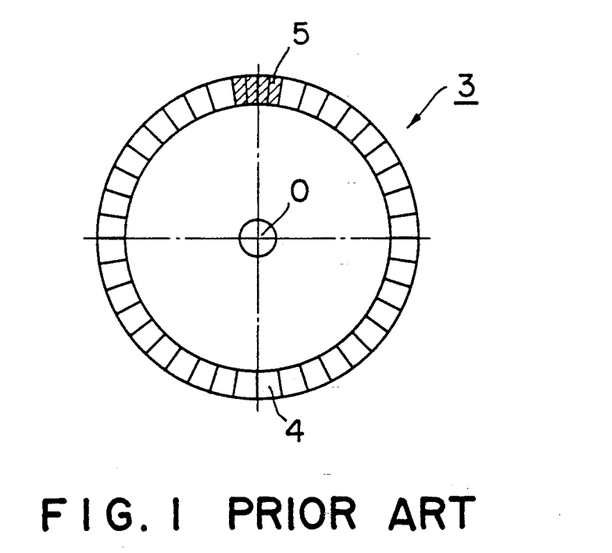
FIG. 1 is a plan view that shows a model of the rotor magnet used in a conventional speed detection apparatus.
Figure 2:
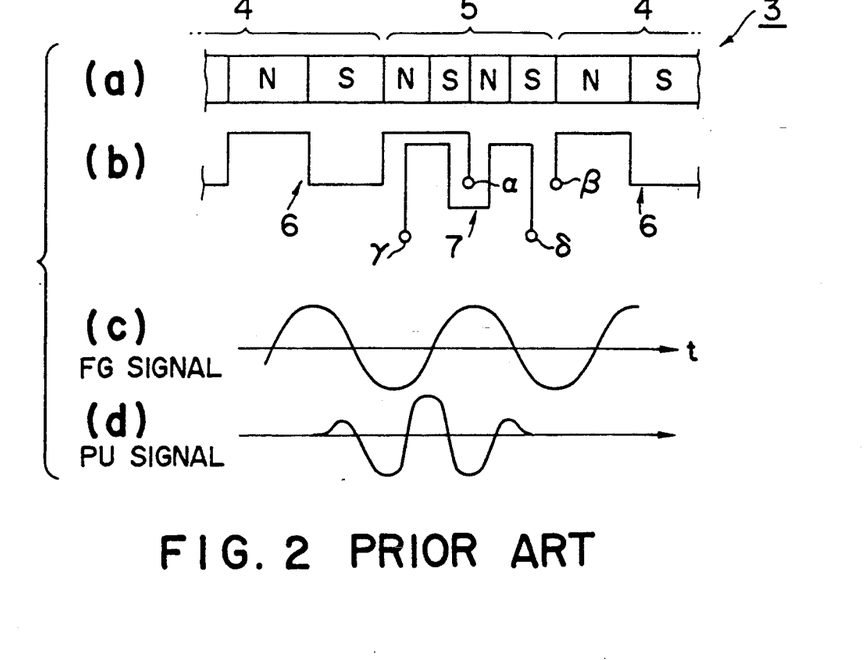
FIG. 2(a) through (d) are respectively, a model view that extends in a linear shape a PU magnetized portion of a rotor magnet in a conventional apparatus, a model view showing a coil pattern corresponding to this, an FG signal waveform diagram obtained by this pattern, and a PU signal waveform diagram.

The structure and principle of operation of a conventional speed detection apparatus having a rotation phase detector and having such a configuration will be described, with reference to FIG. 1 and later. FIG. 1 is a plan view of a rotor magnet 3 (one portion of a rotor) used in a conventional speed detection apparatus having a rotation phase detector, and 4 is a magnetized portion used for speed detection and formed in the direction of the circumference of the rotor magnet 3 for the greater portion (and hereinafter termed an "FG magnetized portion"), and 5 is a magnetized portion for detection of the phase and formed at portions other than those of the FG magnet 4, of those rotor magnets 3 (and hereinafter termed "PU magnetized portion"). The following is a description of the principle of operation in the conventional apparatus, with reference to FIG. 2.

FIG. 2(a) is a view describing the principle of operation, when the portion in the vicinity of the PU magnetized portion 5 of the rotor magnets 3, is extended in a line, and as shown in this figure, the PU magnetized portion 5 has a portion corresponding to two poles of the FG magnetized portion 4 divided equally into four, so as to form a pattern of a two-cycle portion. The FG magnetized portion 4 comprises 38 N or S poles. FIG. 2(b) shows a coil pattern 2 provided so as to oppose this rotor magnet 3, where 6 is an FG coil pattern (hereinafter termed an "FG pattern") for speed detection, and 7 is a PU coil pattern (hereinafter termed a "PU pattern") for phase detection.

In such a configuration, when the position relationship is as shown in FIG. 2(a), that is, when the FG pattern 6 is opposed to the FG magnetized portion 4, an FG signal is generated and is obtained across the terminal $\alpha$ and the terminal $\beta$, as shown in FIG. 2(c). In addition, the PU signal is generated only when the PU pattern is opposed to the PU magnetized portion 5, as shown in FIG. 2(d), and is obtained across the terminals $\gamma$ and $\delta$. In this case, the place where the pitch of the PU magnetized portion 5 and the pitch of the PU pattern 7 have a one-to-one correspondence is one per rotation. The place is provided to correspond to the reference position necessary for detection.

As has been described above, in a conventional speed detection apparatus having a rotation phase detector, the PU magnetized portion 5 does not contribute to the generation of FG signal when it is opposite the FG pattern 6. More specifically, when seen from the FG pattern 6, the status is the same as if the rotor magnet 3 had one non-magnetized portion, and an encoder error occurs when the center point of the FG pattern 6 is displaced from the rotational center of the rotor magnet 3. The cause of this (principle of occurrence) is described with reference to FIG. 3.

Figure 3:
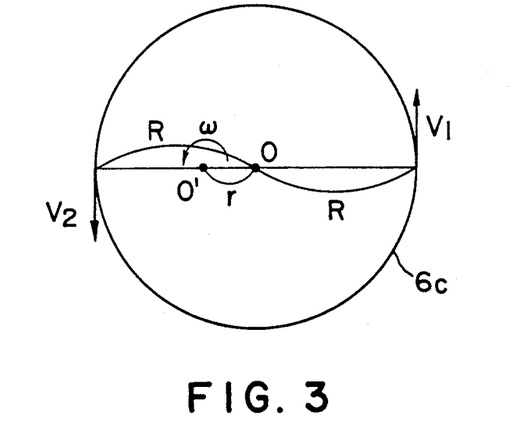
FIG. 3 is a graphical showing the principle for describing the causes of the generation of encoder error.
Figure 8:
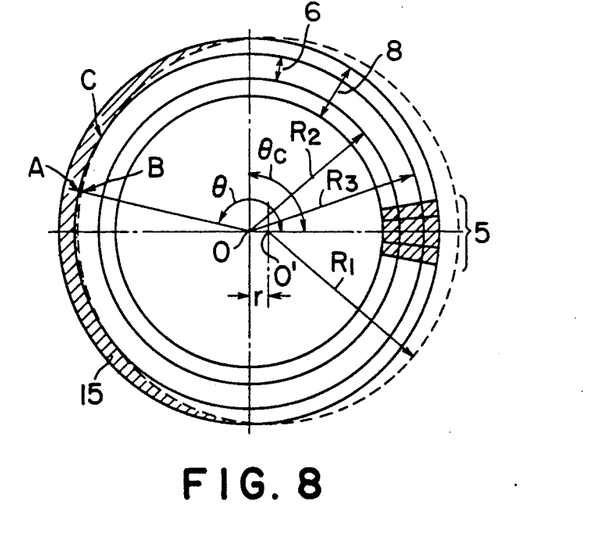

In FIG. 3, $6c$ is a circle of average radius R of the FG pattern 6, O is the center point of the FG pattern 6, and O' is a center of rotation of the rotor magnet 3. Here, the angular speed of rotation of the rotor magnet 3 is $\omega$ and the distance between both centers O and O' is r. Now, when $r \neq 0$, that is, when the two centers O and O' are displaced each other, assuming that the FG magnetized portion 4 is around the entire circumference of the rotor magnet 3, speeds $V_1$ and $V_2$ shown in FIG. 8 are combined, and the average speed is V, according to the following equation.

$$\frac{(V_1 + V_2)}{2} = \frac{\{(R + r)\omega + (R - r)\omega\}}{2} \quad (1)$$
$$= R\omega \; (= V)$$

However, in reality, the FG magnetized portion 4 is in the status where there is a one pulse portion missing on the circumference of the rotor magnet 3 and so $V_1$ and $V_2$ do not combine. Here, the FG magnet can be thought of as having an encoder error in the status where there exists only a one-pulse portion. The other conditions can be the ideal status. More specifically, (1) The FG pattern is of a type of integration for the entire circumference, wherein a true circle, and the line elements are equal to each other, with no surface deviation.

(2) The FG magnet is divided equally with respect to the center of rotation, and the amount of magnetic flux generated by each pole is equal, and there is no surface deviation.

(3) The speed of rotation of the rotor (magnet) is constant.

For these conditions, when the encoder error (fundamental speed of rotation component or the component per rotation per time) is made $E_e$, then:

$$E_e = \frac{(V_1 - V)}{V \times 100} \; [\% \; o\text{-}p] \quad (2)$$
$$= \frac{\{(R + r)\omega - R\omega\}}{(R\omega)} \cdot 100$$
$$= \frac{r}{R \times 100} \; [\% \; o\text{-}p]$$
$$= \frac{r}{R} \times \frac{100}{\sqrt{2}} \; [\% \; o\text{-}p]$$

In reality, since there are FG magnets in other portions, if the number of FG pulses is made n, then the influence of one pulse of the FG magnet becomes $$\frac{1}{n}.$$

Furthermore, if the average diameter of the FG pattern $D = 2R$, then the FG pattern radial deviation $d = 2r$ and substituting this into the equation above gives the encoder error $E_e$ as follows.

$$E_e = \frac{d}{(nD)} \cdot 50 \sqrt{2} \qquad (3)$$

Figure 4:
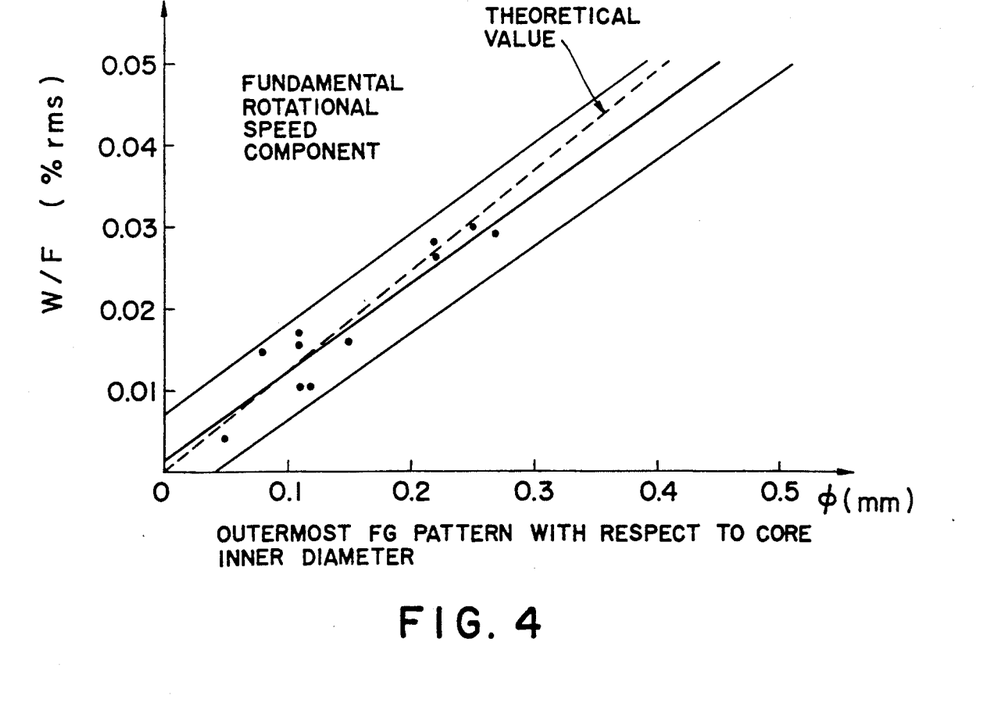
FIG. 4 is a correlation diagram for the measured values and the calculated values (theoretical values) for the generation of encoder error.

FIG. 4 shows the theoretical values (broken line) calculated by substituting the actual numerical value for the rotation speed detector into this equation, and the values (dots) actually measured. As can be seen from this figure, there is a positive correlation of significance level 1% between these two sets of values, and this can be understood as resulting from the encoder error as theoretically described above.

One attempt to solve this problem involves providing a portion where there is either no magnetism or a weak magnetism at a position that balances the PU magnetized portion 5, so as to reduce the encoder error but since this causes places where there is a large difference in the amount of magnetic field generated between adjacent pairs of poles of the FG magnetic portion 4, the PU noise (noise component included in the PU signals) becomes large and there is the disadvantage that this is a cause of malfunction.

SUMMARY OF THE INVENTION

An object of the present invention is to provide a speed detector having a rotational phase detector, and that can prevent the noise component included in the PU signals from becoming larger even if a portion with either no magnetism or a weak magnetism is provided, and therefore remove a cause of misoperation, and which can also reduce encoder error.

In order to achieve this object, the speed detector having a rotational position detector according to the present invention, is provided with a rotor magnet formed with many poles in the direction of the circumference, and a signal detection coil pattern that moves rotationally relative to and opposite the rotor magnet, and has a magnetized portion for phase detection formed on one portion of a rotor magnet, and that also has a magnetized portion for speed detection formed in a direction of a circumference of a rotor magnet other than the magnetized portion for phase detection, and that furthermore, has a crescent-shaped non-magnetized portion provided at a position symmetrical with respect to the magnetized portion for phase detection.

A speed detection apparatus having a rotational phase detector according to the present invention is configured as has been described above so that it is possible to reduce the problems described in a conventional speed detection apparatus having a rotational phase detector, and also reduce the drop in the FG output and the increase in the PU noise, while greatly reducing the accompanying encoder error. Accordingly, when the speed detection apparatus having a rotational phase detector is applied to a rotational drive apparatus of a rotating magnetic head of a VCR, there is the excellent feature of being able to obtain high accuracy for the control signals for the speed servo, while incorporating signals for phase servo.

BRIEF DESCRIPTION OF THE DRAWINGS

The invention will now be described in detail with reference to the accompanying drawings wherein.

DETAILED DESCRIPTION OF THE PREFERRED EMBODIMENTS

Figure 5:
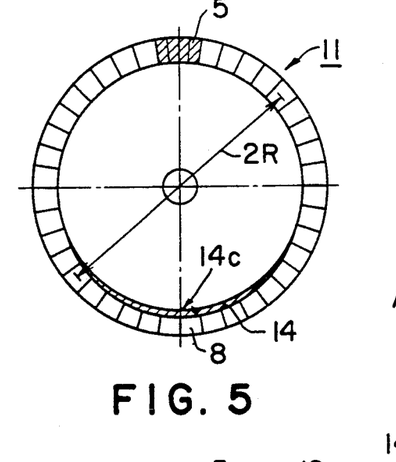
FIG. 5 is a plan view showing the magnetism status of a rotor magnet of a speed detection apparatus according to a first embodiment of the present invention.
Figure 6:
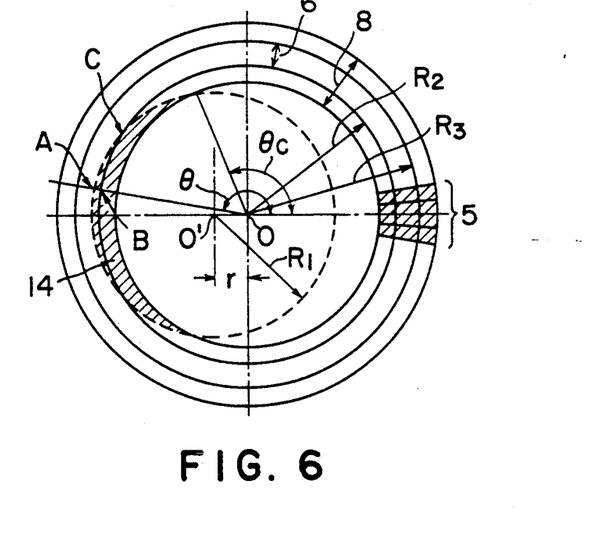
FIG. 6 is a view showing the principle for the analysis of the shape of a non-magnetized portion according to a first embodiment of the present invention.

FIG. 5 is a plan view showing the magnetism status of a rotor magnet and FIG. 6 is a view showing the principle for the analysis of the shape of a non-magnetized portion according to a first embodiment of the present invention. In FIG. 5, those portions that are the same as or similar to corresponding portions in the conventional apparatus are indicated with the same numerals and the corresponding descriptions of them are omitted. As shown in the figure, inside the magnetized portion (FG magnetized portion) for speed detection formed in the rotor magnet 11 is provided a non-magnetized portion 14 of a crescent shape. And, the central portion 14c that has the widest width of the non-magnetized portion 14 is positioned so as to be on the opposite side to the PU magnetized portion 5 described above. By having suitable values for the dimensions and the shape of this non-magnetized portion 14, it is possible to balance the PU magnetized portion 5 and to reduce the encoder error. Also, when this is done, the magnetic field generated between pairs of adjacent S and N poles of the FG magnetized portion 8 for speed detection gradually increases and decreases and so it is possible to control the amount of generation of PU noise and to eliminate malfunction.

The following is a description of the optimum conditions for the shape of the non-magnetized portion in the first embodiment described above, with reference to FIG. 6 describing the principle of operation. As is shown in this figure, r is the distance between the center O of the FG magnetized portion (rotor) and the center O' of the arc of the non-magnetized portion that is to be formed, $R_1$ is the distance (radius) from the center O' to the external edge of the non-magnetized portion, $R_2$ is an inner circumference radius of FG pattern 6, $R_3$ is an external radius of the FG pattern 6, and $\theta_c$ is the angle of opening from the center of the PU magnetized portion 5 to the distal end of the non-magnetized portion 14.

In the case of the first embodiment (inner-side non-magnetized portion) shown in FIG. 5, the equation applied to FIG. 6 becomes as follows:

$$(R_3^2 - R_2^2)\sin(\pi/n) - (R_1^2 - R_2^2 + r^2) \cdot \sin\theta_c - \quad (4)$$

$$rR_1\left\{\pi - \left(\theta_c + \frac{(\sin 2\theta_c)}{2}\right)\right\} + \frac{2r^2}{3}\sin^3\theta_c = 0$$

Where, $\theta_c = \tan^{-1}\dfrac{\sqrt{4r^2 R_2^2 - (R_1^2 - R_2^2 - r^2)^2}}{R_1^2 - R_2^2 - r^2}$ In the case of the apparatus of the present invention, the PU magnetized portion 5 does not contribute to the generation of the FG signal and so the PU magnetized portion 5 is in the same non-magnetized status as FG. Because of this, there is an FG imbalance on the side of the rotor and this combines the imbalance on the stator side and generates the encoder error $E_e$ (one rotation per one time) component. When the magnetic flux density is expressed as $|B|$ and the speed of rotation of the rotor as v, then the non-magnetized status can be expressed as follows.

$$\iint_s v \times |B| dS = 0 \quad (5)$$

Here, the magnetic flux density $|B|$ is practically constant. As is shown in FIG. 6, the center O of the rotor is made the origin, and the center portion of the PU magnetized portion 5 is in agreement with the + side of the x axis, so that the components in the direction of the x axis of the velocity v cancel each other in the upper portion and the lower portion with respect to the x axis, and so the required conditions are $$\iint_s v \cdot \cos\theta dS = 0 \quad (6)$$

Properly speaking, equation (5) is established when there is FG (magnetic flux and coil pattern) formed around the complete periphery and so when the PU magnetized surface as seen from the FG pattern is rewritten in terms of equation (6) as $S_1$ and the non-magnetized surface is rewritten as $S_2$, then:

$$\iint_{s1} v \cdot \cos\theta dS_1 + \iint_{s2} v \cdot \cos\theta dS_2 = 0 \quad (7)$$

The following determines these conditions by calculation. First, in the case of the non-magnetized side on the inner side, the symbols of the preceding item shown in FIG. 6 can be used and the following equations established.

$(x + r)^2 + y^2 = R_1^2$ (magnetized inner periphery of broken line)

$x^2 + y^2 = R_2^2$ (FG pattern inner periphery)

$x^2 + y^2 = R_3^2$ (FG pattern outer periphery)

$\tan\theta = y/x$ (inclination of line of angle $\theta$)

When these are solved, $A_R = -r \cdot \cos\theta + \sqrt{R_1^2 - r^2\sin^2\theta}$ (distance from the origin to the point A)

$B_R = R_2$ (distance from the origin to the point B)

$\theta_c = \tan^{-1}\dfrac{\sqrt{4r^2 R_2^2 - (R_1^2 - R_2^2 - r^2)^2}}{R_1^2 - R_2^2 - r^2}$ (angle from the x axis to the point C)

The determining conditions are as follows:

$$\int_0^{\pi/n}\int_{R_2}^{R_3} R\omega \cdot \cos\theta dRd\theta + \int_{\theta_c}^{\pi}\int_{Br}^{Ar} R\omega \cdot \cos\theta dRd\theta = 0 \quad (8)$$

Moreover, the first item in the left side of equation (8) is the condition relating to the PU magnetized portion 5 and the second item of the same is the condition relating to the non-magnetized portion 14. When $\theta = \pi$ and in the vicinity of this, $R_1^2 > > r^2\sin^2\theta$ and so solving the above equation as $R_1^2 - r^2\sin^2\theta \doteq R_1^2$ determines the following equation.

$$(R_3^2 - R_2^2)\sin(\pi/n) - (R_1^2 - R_2^2 + r^2)\sin\theta_c - \quad (9)$$

$$rR_1\left\{\pi - \left(\theta_c + \frac{(\sin 2\theta_c)}{2}\right)\right\} + \frac{2r^2}{3}\sin\theta_c = 0$$

Here, the invention is applied to a specific apparatus (FG pulse number n=20) that is actually used and values suitable for r and R are successively substituted so that values for r and R so that the left side becomes zero are determined as follows.

The non-magnetized inner side:

$R_1 = 13.3 + r, R_2 = 13.85, R_3 = 15.05$

From the above, r=0.417
Accordingly, r≒0.42

Figure 7:
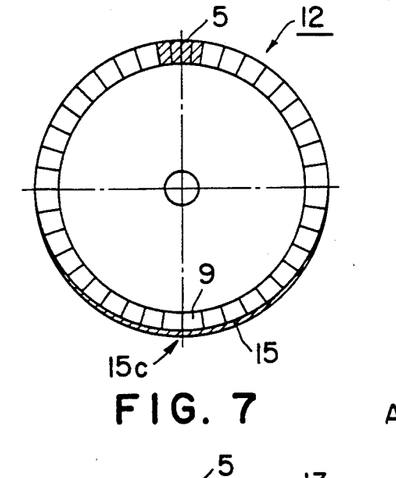
FIG. 7 and FIG. 8 are respectively, a plan view of a magnetization status of a rotor magnet of a speed detection apparatus according to a second embodiment of the present invention, and a view showing the principle for shape analysis of the non-magnetized portion.

Moreover, in the first embodiment, the non-magnetized portion 14 is as shown in FIG. 5, provided adjacent to the inner side of the FG magnetized portion 8 and the present invention is not limited to this, as it can be provided adjacent to the outer side of the FG magnetized portion 9 as in the case of the second embodiment shown in FIG. 7.

In addition, in the case of the second embodiment (outer side non-magnetized) shown in FIG. 7, the required condition is expressed by the following equation used in FIG. 8.

$$(R_3^2 - R_2^2)\sin(\pi/n) - (R_3^2 - R_1^2 + r^2)\sin\theta_c - \quad (10)$$

-continued $$rR_1\left(\pi - \left(\theta_c + \frac{(\sin 2\theta_c)}{2}\right)\right) + \frac{2r^2}{3}\sin^3\theta_c = 0$$

Where, $\theta_c = \tan^{-1}\dfrac{\sqrt{4r^2R_3^2 - (r^2 - R_1^2 + R_3^2)^2}}{r^2 - R_1^2 - R_3^2}$ $(x + r)^2 + y^2 = R_1^2$ (magnetized inner periphery of broken line)

$x^2 + y^2 = R_2^2$ (FG pattern inner periphery)

$x^2 + y^2 = R_3^2$ (FG pattern outer periphery)

$\tan\theta = y/x$ (inclination of line of angle $\theta$)

When these are solved in consideration of the conditions the same as for the first embodiment as has been described, the following equation is determined.

$$(R_3^2 - R_2^2)\sin(\pi/n) - (R_3^2 - R_1^2 + r^2)\sin\theta_c - \quad (11)$$

$$rR_1\left(\pi - \left(\theta_c + \frac{(\sin 2\theta_c)}{2}\right)\right) + \frac{2r}{3}\sin^3\theta_c = 0$$

Here, when each of the values are calculated for the case when the second embodiment for the outer side magnetism is applied to a specific apparatus (FG pulse number n=20) that is actually used, then for The non-magnetized outer side:

$R_1 = 15.65 - r$, $R_2 13.85$, $R_3 = 15.05$

From the above, r=0.435

Accordingly, both the inner side and the outer side non-magnetism (the first and second embodiments) have r≑0.42 (mm) and so becomes the optimum condition. In this case, the dimension (the width of the position symmetrical with respect to the central portion of the PU magnetized portion 5) of the maximum width of the non-magnetized portions 14, 15 is approximately 0.6 mm.

Figure 9:
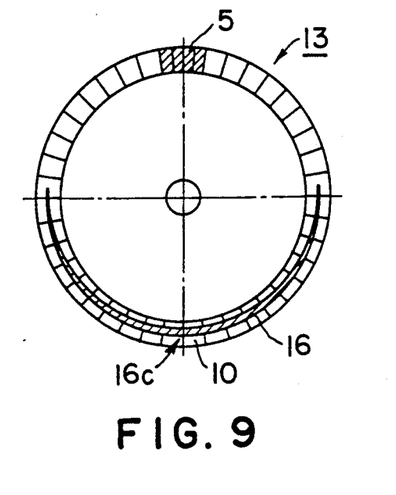
FIG. 9 is a plan view of the magnetization status of a speed detection apparatus according to a third embodiment of the present invention.

Moreover, the configuration for the rotor inner-side of the magnetized portion provided for the rotor magnet is not limited to that of the first and the second embodiments, and, for example, the configuration can also be as shown for the third embodiment in FIG. 9.

As shown in FIG. 9, it can also be provided between the FG magnetized portion 10, that is, in the central portion on the normal line, and if the above conditions are satisfied that the central portions 15c, 16c for which the width of the non-magnetized portions 15, 16 is widest are positioned so as to be precisely opposite with respect to the PU magnetized portion 5, then the same effect can be obtained and so the present invention is not limited to a specific position.

Here, when a third embodiment having an intermediate magnetism is applied to a specific embodiment, then from equation (9) and equation (11), r and $R_1$ through $R_3$ become intermediate numerical values for the inner side magnetism and the outer side magnetism.

Accordingly, the maximum dimension and the shape of the non-magnetized portion 16 shown in the third embodiment in FIG. 9 can also be formed so as to have a similar shape.

Figure 10:
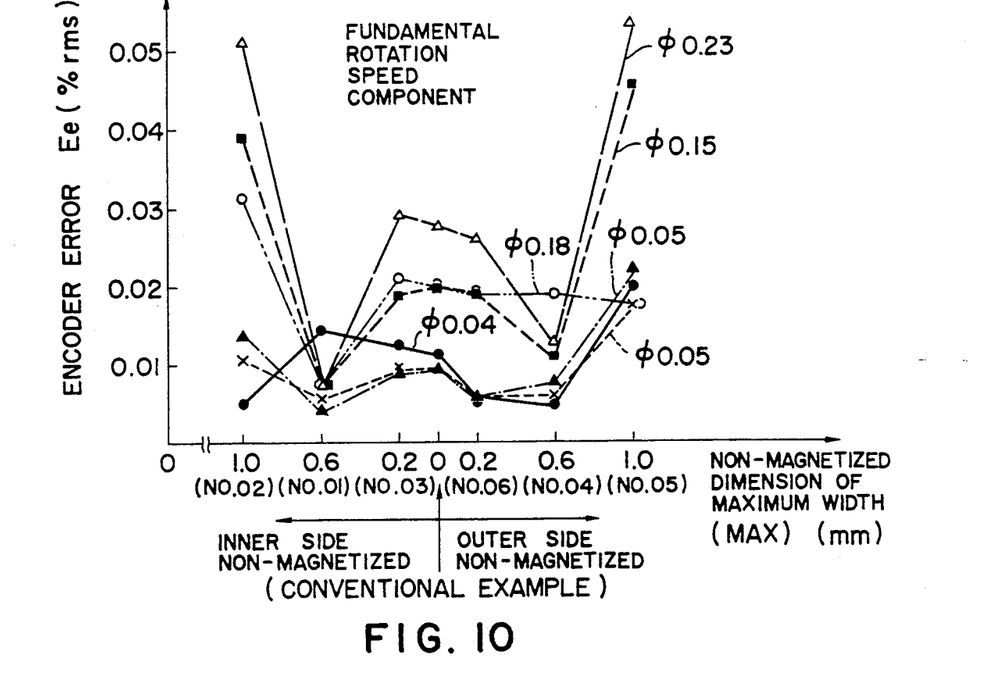
FIG. 10 is a graphical showing of measured values for encoder error in a speed detection apparatus according to a first through a third embodiment of the present invention, and a view of characteristics showing a comparison with a conventional apparatus.

FIG. 10 shows the values actually measured for the fundamental speed of rotation component $E_e$ (45 Hz component) of the encoder error, for a total of seven types of rotor magnet having maximum widths of the non-magnetized portion 14, 15 of 0.02, 0.6, 1.0 for each of the embodiments (inner side, outer side non-magnetized) of the present invention and for a conventional apparatus. In the figure, $\phi$ is a degree of pattern coaxially. As is clear from this diagram, when compared to the conventional example (where the dimension of the maximum width of the central non-magnetized portion=0), there is a significant reduction in the embodiment of the present invention (with the same dimension=0.6 mm).

Figure 11:
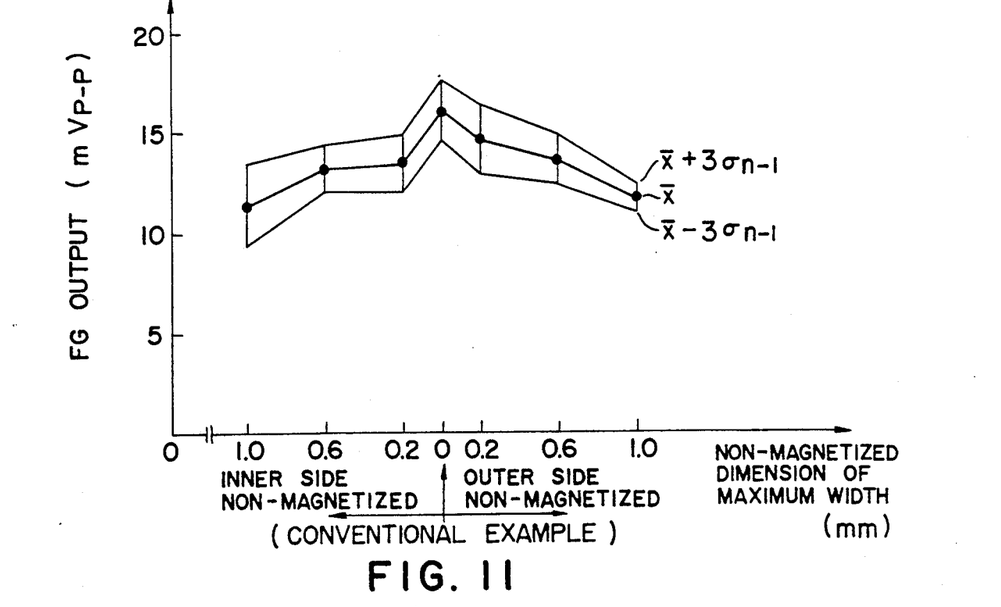
FIG. 11 is a graphical illustration of characteristics showing a comparison of measured values for the FG signals for first through third embodiments of the present invention, and characteristics showing a comparison with a conventional apparatus.
Figure 12:
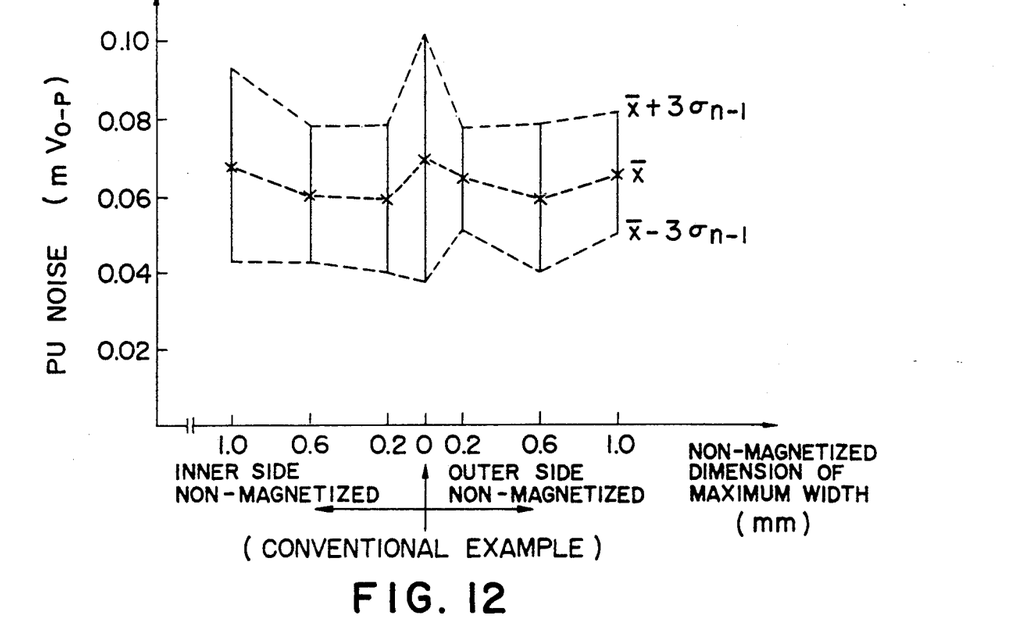
FIG. 12 and FIG. 13 are graphical illustrations, respectively, of characteristics showing a comparison of measured values for the PU noise and the PU signal output level for first through third embodiments of the present invention, and characteristics showing a comparison with a conventional apparatus.
Figure 13:
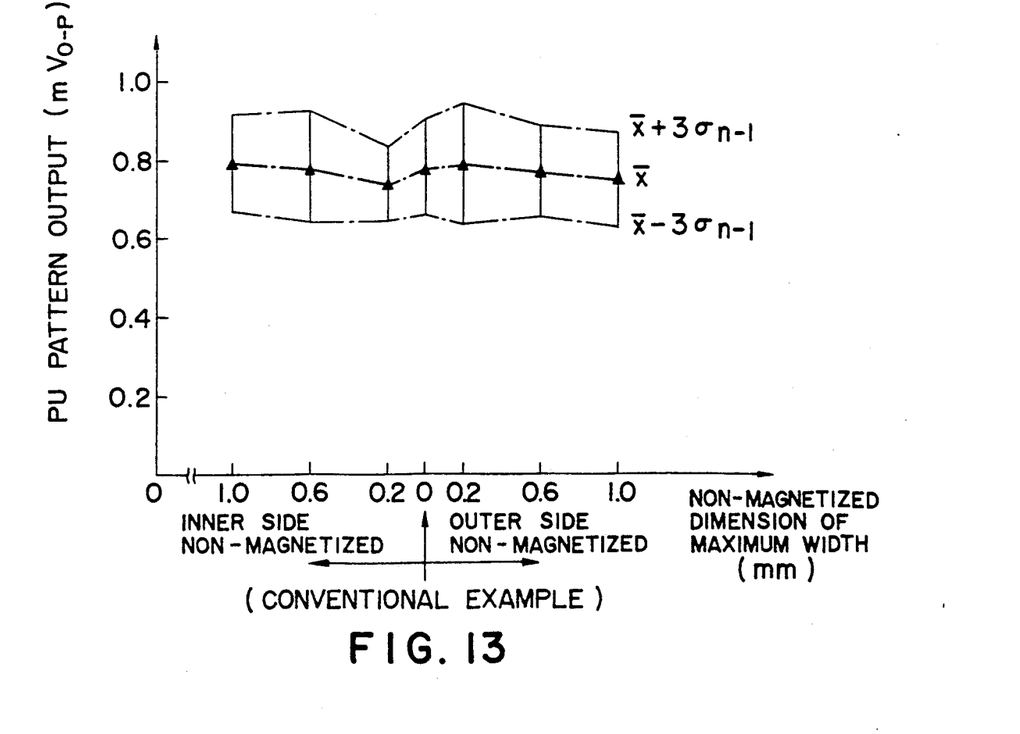

In each of the embodiments of the present invention, the width of the FG magnetized portion 8-10 becomes narrower by the amount where the non-magnetized portion 14-16 are formed and so the lowering of the FG output and the increase of the PU noise could be anticipated, but as a result of measurements, as shown in FIG. 11, the FG signal output dropped at about one tenth when compared to the conventional embodiment and there was practically no increase in the PU noise (refer to FIG. 12). Moreover, the output level of the PU signals showed practically no change, as seen in FIG. 13.

I claim:

1. A speed detection apparatus having a rotation phase detector, provided with a rotor magnet mounted on a rotor, a plurality of magnetized portions formed on the rotor in the direction of the circumference thereof, and a coil pattern for signal detection rotationally displaced relative to an opposing rotor magnetic, said rotor magnet comprising:
   a first magnetized portion for detection of a rotation phase of said rotor magnet and formed in one portion of said rotor at a specific position;
   a second magnetized portion for detection of a rotation speed of said rotor and provided at a portion other than said first magnetized portion; and
   a non-magnetized portion having a crescent shape and provided at a specific position on said rotor that is symmetrical from a center of rotation of said rotor, with respect to said first magnetized portion.

2. The speed detection apparatus having a rotation phase detector as claimed in claim 1, wherein:
   said non-magnetized portion is fixed on a side of an inner circumference of said second magnetized portion of said rotor magnet.

3. The speed detection apparatus having a rotation phase detector as claimed in claim 2, wherein:
   said crescent shape of said non-magnetized portion has the surface of the inner side thereof as an arc of a circle forming an inner circumference of said rotor magnetic, and the surface of the outer side thereof as an arc which is in agreement with the outer periphery of a circle that has the center of rotation (O') moved so as to separate from said first magnetized portion by a specific distance (r) from the center of rotation (O) of said rotor magnet.

4. The speed detection apparatus having a rotation phase detector as claimed in claim 1, wherein:
   said non-magnetized portion is fixed to the side of the outer periphery of said second magnetized portion of said rotor magnet.

5. The speed detection apparatus as claimed in claim 4, wherein:
   a crescent shape of said non-magnetized portion has the surface of the outer side as an arc forming a surface of the outer circumference of said rotor, a surface of the inner side being in agreement with one portion of the outer periphery of a circle that has the center of rotation (O') closer in the direction of said first magnetized portion, by a specific distance (r) from the center of rotation (O) of said rotor magnet.

6. The speed detection apparatus as claimed in claim 1, wherein:
said non-magnetized portion has a crescent shaped section embedded between an outer peripheral surface and an inner peripheral surface of said second magnetized portion, so that a thickest portion thereof is in a position symmetrical with respect to said first magnetized portion.

7. The speed detection apparatus as claimed in claim 1, wherein:
said speed detection apparatus comprises said rotation phase detector and a speed detector;
said rotation phase detector comprises
said first magnetized portion which is formed in one portion of said specific portion of said rotor magnet, and
a first coil pattern corresponding to a first magnetized pitch of said first magnetized portion one by one; and
said speed detector comprises
said second magnetized portion provided at a portion other than said first magnetized portion of said rotor magnet and having a second magnetized pitch which is twice as large as said first magnetized pitch, and
a second coil pattern provided at a specific portion that is symmetrical to said first magnetized portion from a center of rotation of said rotor magnet, and which corresponds to said crescent non-magnetized portion and said second magnetized pitch one by one.

* * * * *